Nov. 18, 1952 W. McFEE 2,618,059
HEDGE TRIMMER
Filed May 27, 1946 2 SHEETS—SHEET 1
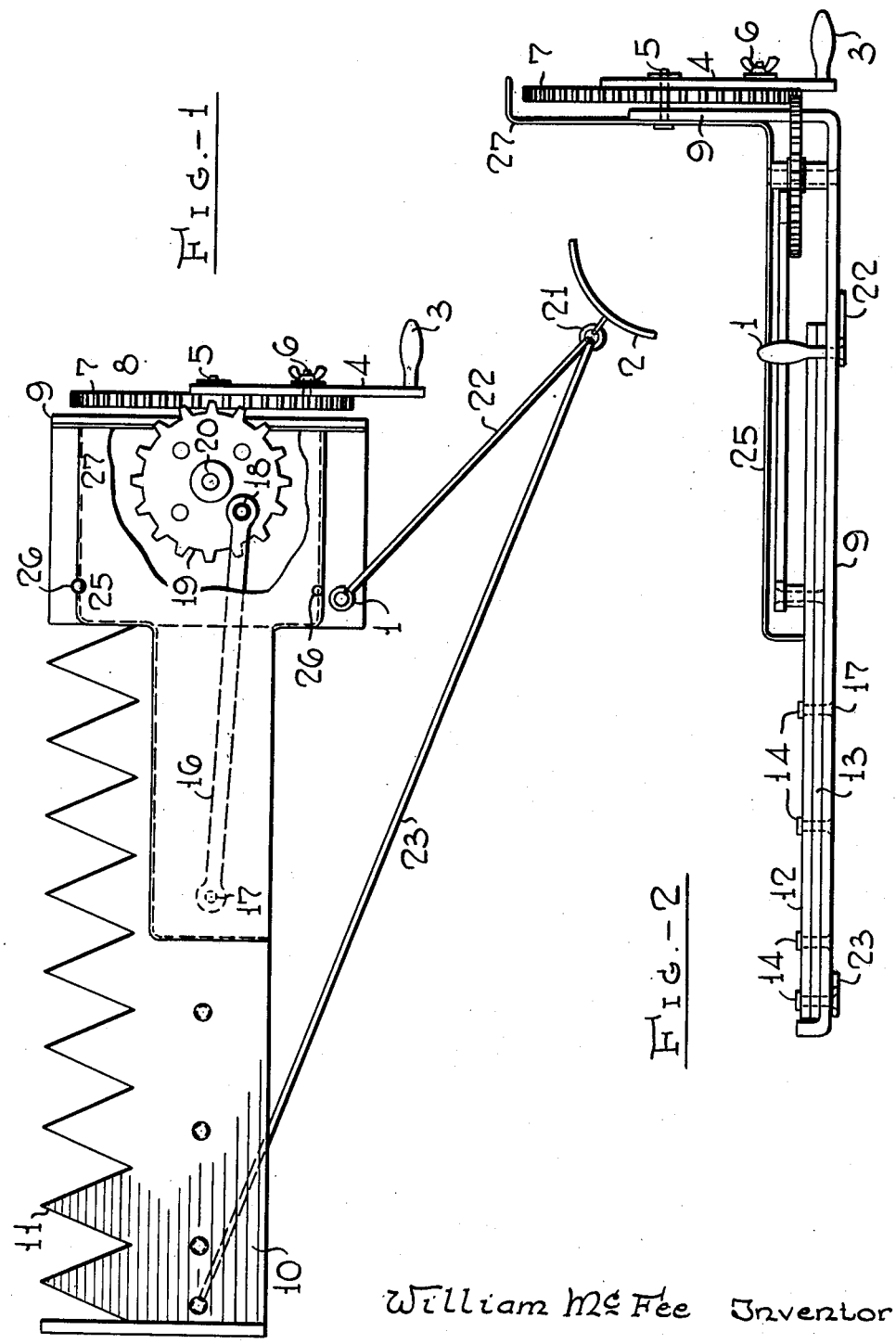
William McFee Inventor
by W. H. Smyers Attorney Nov. 18, 1952        W. McFEE        2,618,059
HEDGE TRIMMER Filed May 27, 1946        2 SHEETS—SHEET 2

William McFee Inventor
By W. N. Smyers Attorney

Patented Nov. 18, 1952

2,618,059

UNITED STATES PATENT OFFICE 2,618,059

HEDGE TRIMMER

William McFee, Pittsburgh, Pa.

Application May 27, 1946, Serial No. 672,572

2 Claims. (Cl. 30—198)

This invention relates to an improved hedge trimmer, more particularly to a portable hedge trimming machine. It is described and illustrated as hand operated, although it may be power driven, as will be explained.

The hedge trimmer of this invention has a number of advantages over those made heretofore, namely simplicity of manufacture and operation, better bracing, both in respect to power and balance, better cutting, and better gearing.

Figure 3:
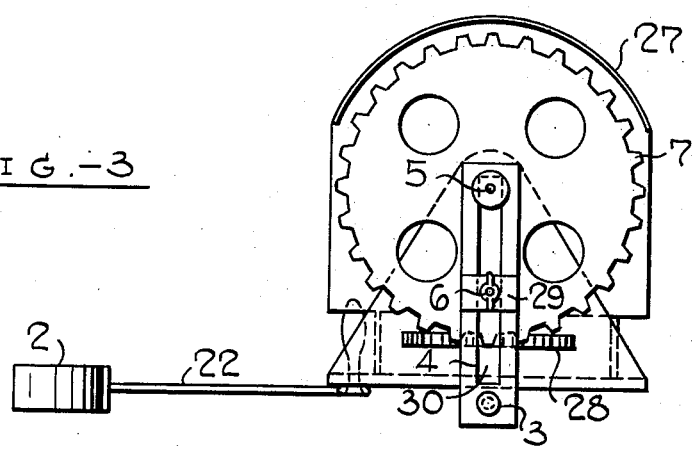
Figure 4:
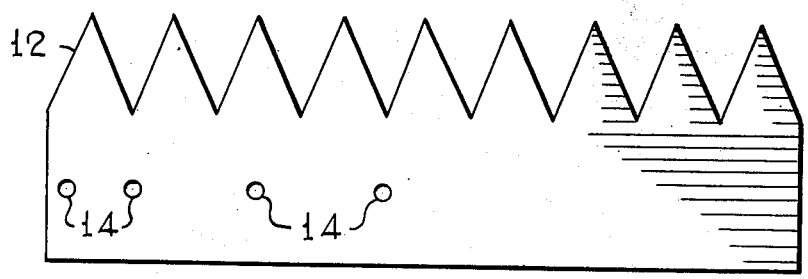
Figure 5:
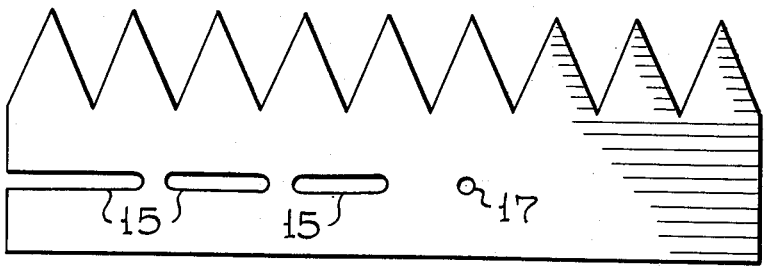

The objects, advantages and details of the invention will be better understood from the following description read in conjunction with the accompanying drawing in which Fig. 1 represents a plan view of the hedge trimmer when in horizontal cutting position, part of the hood being broken away, Fig. 2 is a side elevation, Fig. 3 is an end elevation, Fig. 4 shows a plan view of the upper stationary blade, and Fig. 5 shows a plan view of the middle or moving blade. In the several figures, like numerals represent like parts.

Referring to Fig. 1, which shows a plan view of the hedge trimmer when in horizontal cutting position, the person operating the machine takes the handle or hand hold 1 in his left hand, lifts the machine, which is very light in weight, to the height at which it is desired to cut the hedge, and braces the adjustable body rest 2 against the trunk of the operator's body, usually against the chest, and then takes the crank handle 3 in his right hand. The machine is operated then by turning the crank with the right hand while slowly walking in the direction of the points of the blade. A lightweight electric motor, operated by extension cord from house current or from a mobile gasoline-driven electric generator, may be used instead of the handcrank.

The handle 3 is fastened at right angles to the crank 4 which is pivoted on a bolt 5, and which, by means of a bolt with wing nut 6 is attached to a drive gear 7 which rotates in a vertical plane when the crank handle 3 is turned. As indicated in the drawing, the crank 4 is adjustable in length, by working through a slot 33 in the crank extending from the pivot end to near the handle 3, and is shown attached in the longest position. To use it in the shortened position, the wing nut 6 would be slightly released and the crank moved into shortened position by sliding the crank over the pivot bolt 5 and the wing nut bolt, and then the wing nut would be tightened. A longer crank gives more power, but a shorter crank preferably is used when cutting hedges which are so wide that the operator's hand working the crank handle 3 would get scratched on the freshly cut branches of the hedge.

The drive gear 7 is held in vertical position by having its axle bolt 5 fastened to a vertical flange 9 which preferably consists of an upwardly bent more or less triangular shaped end of the horizontal main body plate 10, which, at the gear end is much wider than at the other extremity or the blade end. About two-thirds of the front edge of the body plate 10 is serrated to form the lower stationary blade 11. The rest of the cutting mechanism comprises an upper stationary blade 12 and a middle moving blade 13. The two stationary blades 11 and 12 are fastened, by means of bushing bolts 14, so that these stationary blades will have sufficient clearance between them for the moving blade 13 to slide back and forth without too much friction. Moving blade 13 is provided with suitable slots 15, through which bolts 14 can pass, to permit the moving blade to slide back and forth and yet be held in proper position. The desired reciprocating motion is imparted to the moving blade 13 by a pitman 16 fastened to the moving blade 13 by means of bolt 17. The other end of the pitman 16 is fastened by means of another bushing bolt 18 eccentrically to the pitman gear 19, which rotates in a horizontal plane on axle bolt 20 fastened to the main body plate 10, and which is positioned so that the teeth of the horizontal pitman gear 19 will mesh with the teeth of the vertical drive gear 7.

Hand hold 1 is fastened to the main body plate 10, as indicated in the drawing, at a position along the rear edge thereof which will give best support in bracing the machine against the body of the operator, and at the same time give proper balance. Hand hold 1 is preferably fastened perpendicular to the body plate 10, although if desired, it could also be attached thereto in a horizontal position either parallel to or at right angles to the rear of the blade, or the handle may be made adjustable for any of those three positions. The adjustable body rest 2, which may be a curved rod or elongated flat strip of metal, or a metal plate, or a curved piece of wood, any of these being covered if desired with leather, cloth, rubber or other cushioning means, is attached by means of universal joint 21 to the main body brace 22, preferably consisting of a thin round steel bar or an aluminum rod or hollow tube, which in turn is fastened to the body plate 10, preferably at the same place as hand hold 1. An end brace 23 is attached to the blade end of the main body plate 10 by means of one of the bolts 14 and the other end of the end brace 23 is fastened by bolt or by welding, soldering or any other suitable means to the main body brace 22 near the universal joint 21.

In order to reduce the operational friction of the machine, it is preferable to provide some ball bearings between the pitman gear 19 and the main body plate 10. These ball bearings, anywhere from 4 to 10 or more, are preferably positioned between halfway and three quarters of the way between axle bolt 20 and the periphery or edge of the pitman gear 19. These ball bearings are held in place by steel cups set in the main bottom plate.

For protection of the operator, and as a general precaution, as for preventing cut hedge branches from getting caught in the gears, a horizontal hood 25 is provided to cover the pitman gear 19 and the pitman 16. This horizontal hood may be held in place by any suitable means such as two small bolts 26. Another cover, namely a vertical hood 27, is provided to cover the side of the drive gear 7 which is most likely to come into contact with falling cut branches of the hedge. This hood 27 is held in place chiefly by bushing bolt 5 which fastens the hood to the vertical flange 9. It is also convenient to hinge the two hoods together along their edges of contact near where the teeth of the two gears mesh together; for this purpose either ordinary metal hinges may be used by riveting them to the two hoods, or simply some slots may be cut near the adjacent edges of the two hoods and then fastened together by suitable means such as by small leather thongs. A slot 28 is cut near the bottom edge of the vertical flange 9 so that the teeth of the pitman gear 19 may protrude through the lower part of flange 9 in order to mesh with the teeth of vertical drive gear 7.

Fig. 2 shows a side elevation of the hedge trimming machine when in horizontal cutting position. This shows clearly how the hand hold 1 is always on the opposite side of the cutting machine from the cut end of the hedge branches so that the operator's left hand will not be scratched by the hedge branches. In Fig. 2 the crank 4 is shown in the lengthened position, as may be readily seen by comparing the position of the crank handle 3 shown in solid outline as compared by the similar one in dotted line which shows where the crank handle 3 would be if the crank 4 were shortened as previously described. Fig. 2 also shows how the vertical hood 27 may be bent over at its outer edge to protect the vertical drive gear 7.

Fig. 3 shows an end elevation of the hedge trimmer when in horizontal cutting position. Here it is also observed how the crank handle may be adjusted in length, and this view also shows more clearly the slot 28 near the lower edge of the flange 9, through which the teeth of the horizontal pitman gear 19 protrude and mesh with the vertical drive gear 7.

Fig. 4 shows a plan view of the upper stationary blade 12, and Fig. 5 shows a plan view of the moving blade 13.

Although it will be understood that the nature of the materials used in making the hedge trimmer of this invention may be varied without departing from the scope of the invention, and the dimensions of the various parts of the machine may be subject to some modification according to the desired overall size of the machine or according to the nature of the materials used in constructing the various parts of the machine, the following description is given as representing preferred, suitable or alternative, modifications of the invention, in respect to the nature of materials used and the dimensions of the parts.

The stationary blades 11 and 12 and the moving blade 13, which is provided with beveled edges along the teeth of the blade, are preferably made of hardened steel. The three blades, i. e. the two stationary blades and the intermediate moving blade may all be $\frac{1}{16}$" thick, 14" long and have an overall width of about 5", the teeth being about 2" long and about 1½" wide at the base. These blades are preferably made out of stainless steel or some other non-rusting metal.

The gears may be made out of various suitable materials, such as steel, aluminum, magnesium, hard rubber, laminated resin-fabric, or other suitable hard, tough plastic, the thickness ranging approximately from $\frac{1}{32}$" to ¼", depending upon the strength of the material used. For instance, they may be made out of steel which is about ⅛" thick.

More specific details are given herewith in regard to dimensions of a model of the invention which has been found to work very satisfactorily. Referring to the principal parts of the machine in the same order as mentioned above in reference to the drawing, the handle 1 may be about 4½" high. The body rest 2 is preferably a thin strip of steel or wood about 10" long and 2" wide with a curvature corresponding to a circle of 8" radius. The crank handle 3 may also be 4" to 5" in length. The crank 4 may be about 7" long, and preferably made of strap steel or iron about 1" wide and about ⅛" thick, with a hole in one end for attaching the handle 3, and a central longitudinal slot about $\frac{9}{32}$" wide, of which the end opposite the handle rotates about the pivot bolt 5 when the crank is in the long position. A strap 29 of $\frac{1}{16}$" strip iron or steel 1" wide extends across hand crank 4 and is turned down at each end to hold in place. The crank 4 is lengthened or shortened by loosening the wing nut 6, sliding the crank longitudinally to the desired position, and then tightening the wing nut 6. The drive gear is preferably 6" in diameter.

The flange 9, main body plate 10 and blade 11 are preferably all made out of a single piece of steel, the one end being cut down in triangular form and rounded off to form the flange 9 as shown clearly in Fig. 3, while the remainder of the sheet is cut along one edge to form the teeth of the blade 11, and the other edge is cut back some in order to reduce the weight. The solid part of the body plate 10, which is immediately beneath the small gear 19, may be 6⅜" wide to correspond to the base of the flange 9, and may be about 3" long to correspond to the diameter of the pitman gear 19. The holes in the lower blade 11 and the upper blade 12 may be about ¼" in diameter, for connecting with suitable bolts 14, and the corresponding slots in the moving blade 13 may be about 2" long and about ⅜" to $\frac{13}{32}$" wide. The pitman or drive shaft 6 may be about 4" long and about ⅜" wide and about $\frac{1}{16}$" thick, preferably made out of steel, although other dimensions may be used if the pitman is made out of wood, steel, aluminum, magnesium, hard rubber tube, etc.

The pitman gear 19 may suitably be 3" in diameter, so that the ratio of the drive gear to the pitman gear will be 2:1.

The body brace 22 is preferably about 14¾" long and the end brace 3 may be 23", both of these braces suitably being made out of ¼" diameter round iron rod, although other suitable materials may be used such as aluminum rod or a hollow metal or plastic tube of sufficient strength.

The two hoods 25 and 26 may suitably be made of wood about ¼" thick, or a thin hard rubber or Bakelite or other suitable plastic sheet material. The horizontal hood should be about 4" to 4½" wide in order to cover the pitman gear 19 and should be about 8" long in order to cover the pitman 16 in its outermost position, this hood being of course cut back so as to not interfere with the operation of the blade. The vertical hood 26, intended to cover the drive gear 7, may suitably be 6⅜" wide and about 6½" high.

It is not intended that this invention be limited to the specific modifications and dimensions which have been recited merely for the sake of illustration, but only by the appended claims in which it is intended to claim all novelty inherent in the invention, as well as all modifications coming within the scope and spirit of the invention.

I claim:

1. A portable hedge trimming machine consisting of a base plate of sheet steel having one end elongated and in the same plane thereof and being serrated with sharpened teeth along one edge, to serve as stationary cutting blade, and having the other end bent up perpendicularly to serve as an end flange, an axle bolt mounted perpendicularly through said flange, a large drive gear wheel mounted on said axle bolt on the outer side of said flange, means for turning said driving gear, another axle bolt mounted perpendicularly on the upper surface of said base plate, a pitman gear wheel, smaller than the driving gear, mounted on said base axle bolt, said gears being connected in driving relation, with their respective said two axle bolts being in spaced relation and at right angles to each other, the end flange having a slot near its base in the plane of the pitman gear to permit protrusion of said pitman gear just sufficiently to engage with the driving gear, a reciprocable sheet steel serrated cutting blade slidably mounted flatwise adjacent to the stationary blade, a pitman connecting said reciprocable blade with the pitman gear by a bolt mounted on the reciprocable blade and a bolt mounted eccentrically on the pitman gear, whereby said strip blade is reciprocated, the stationary blade having a plurality of bushing guide bolts mounted thereon which protrude through co-operating guide slots in the reciprocable cutting blade, a unitary guard structure of sheet material having a main portion overlying the pitman and pitman gear and mounted on the base through the pitman gear axle and having an end turned up perpendicularly thereto, said end being mounted by means of the drive gear axle bolt, the extremity of said turned up end being further bent to overlie the periphery of said drive gear, a body rest, a pair of elongated brace members, each having one end connected to opposite ends of said base plate, the other ends of said brace members being connected to each other and to the body rest member by means of a universal connection, one of said body braces being rigidly connected to said machine at a balanced position between the cutting end thereof and the drive gear thereof, a hand hold mounted on said machine at the same place where said last mentioned body brace is attached thereto, the other and brace making a triangular connection between the extreme cutting end of the machine and the end of the first mentioned body brace nearest to the body rest.

2. Machine according to claim 1, having an additional sheet steel cutting blade having serrations along a longitudinal edge thereof, mounted on said guide bolts to overlie said reciprocable blade and to be stationary relative thereto.

WILLIAM McFEE.

REFERENCES CITED

The following references are of record in the file of this patent:

UNITED STATES PATENTS

| Number | Name | Date |
|---|---|---|
| 1,530,571 | Morrow | Mar. 24, 1925 |
| 1,562,884 | Hines | Nov. 24, 1925 |
| 1,579,783 | Ross | Apr. 6, 1926 |
| 1,805,864 | Benzel | May 19, 1931 |
| 1,877,032 | Ortt | Sept. 13, 1932 |